UNITED STATES PATENT OFFICE 2,268,351

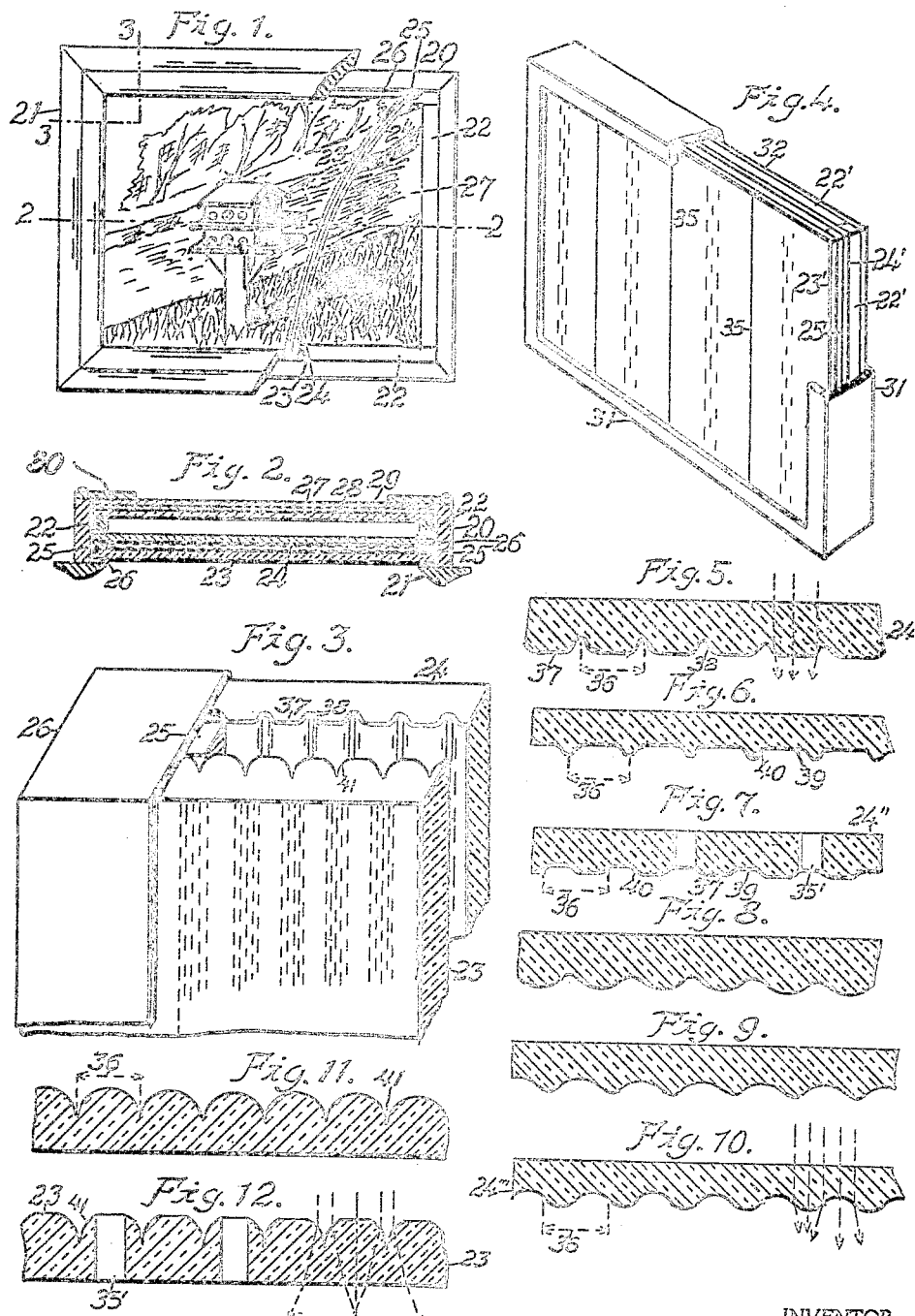

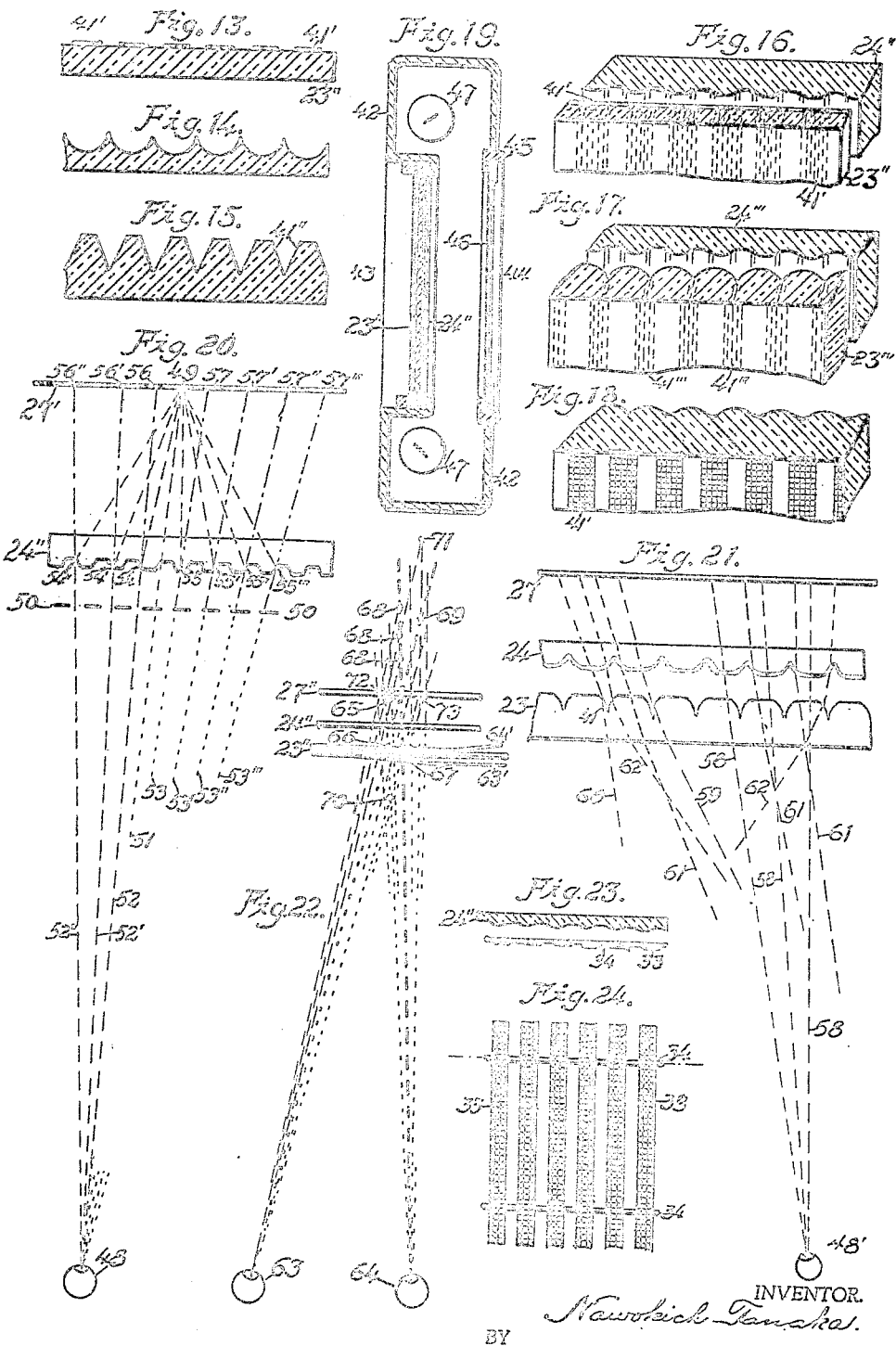

MEANS FOR PRESENTING PICTURES IN APPARENT THREE DIMENSIONS

Nawokich Tanaka, Brooklyn, N. Y.

Application August 25, 1938, Serial No. 226,727

6 Claims. (Cl. 88—24)

The present invention relates to means for presenting pictures in apparent three dimensions, and more particularly to a refractive screen through which photographic or other perspective pictures may be made to appear with depth.

The invention resides on my discoveries: I found that the eyes may perceive illusory third dimension in a picture, when viewed through a refractive screen which is adapted to refract rays of light coming from each small part of the picture plurally in different directions, preferably in such manner that one eye would perceive an image of each part of the picture in one direction, while the other eye would view images of the same part in several slightly different directions. This gives rise to plural intersections of visual lines from both eyes all on a single visual line, variously on the plane of the picture and in front or at the back of the picture, depending upon the position of the eyes with respect to the screen. I found that one way to accomplish this universally for all intended viewing positions is by means of a screen of transparent sheets or plates having two superposed striped surfaces, one striped with multitudinously recurring grooves and ridges of suitable contour and the other with a multitude of light admissive and interceptive stripes in suitable relative pitches. The spacing between the two surfaces is so adjusted that moire patterns manifesting to the eyes of a spectator at a suitable distance from the screen, as a result of the moire effect due to the interaction of the striped surfaces, would appear with a pitch which enables the eyes to perceive images of each part of the picture by differently refracted rays through dissimilar parts of the moire patterns.

The above mentioned light admissive and interceptive stripes may be either opaque and transparent stripes or stripes functionally equivalent thereto such as stripes formed by deep cut grooves as will be later apparent.

As novel and distinguishing features of this invention, stressed is the functional relation between the two optical surfaces and the distance therebetween for creating a moire effect of suitable pitches and utilizing it for the present purpose. While the construction of some of the individual grooved plates herein shown and described as suitable constituents of the screen may be known, the combination of two superposed surfaces of distinctly different designs having such characteristics capable to manifest a suitable moire effect as herein described is claimed to be basically new and so is the principle on which this invention operates.

In stereoscopes and all other stereoscopic devices which operate on the well known principle depending upon the coordination of left and right eye images, eyes are made to stereoscopically focus on each and all points in the view for the same adjustment of the eyes. This would be an impossible feat for any pair of eyes to perform in nature, wherein the objects in a view are at different distances from the eyes, and hence the image perceived by the ocular sensory organs can not be exactly like what we perceive in the three dimensional space.

In contrast thereto, neither separate nor distinct left and right eye views are required in the present invention to attain the purpose, since it does not rely on such pair of images which are vital requisites for every stereoscopic device, but ordinary photographs, photographic prints both in full and half tone and even certain other perspective pictures may be effectively used and the result obtainable therewith is more natural in manifestation of the third dimension than in the stereoscopic devices. This is another distinguishing feature of the invention.

I am aware that an attempt has been made to obtain a three dimensional illusion by projecting a picture on a superposed series of finely embossed transparent sheets added in front of a projection screen, the idea being to obtain rays reflected from a number of planes in addition to those reflecting from the opaque screen. However, the images reflecting from several planes would be mutually displaced from one another, differently for each different angular position of viewing eyes, resulting to the limitation of effective viewing scope, even when inevitable blurring of images due to such arrangement is not considered. I am also aware that a similar attempt is recorded in which a projected picture is purposely blurred through a refractive screen to obtain a sort of pseudo stereoscopic effect in the picture. As will be readily understood, in these schemes there is employed no definite means for coordinating mutually displaced images perceived by the two eyes of a spectator in order to create the illusion.

The primary object of this invention is to provide means whereby photographs, photographic prints and certain other perspective pictures on either opaque, translucent or transparent carriers and projected pictures as in a motion picture or lantern slide projection may be presented in apparent three dimensions for a large viewing scope, without resorting to eye pieces.

Another object is to provide a displaying means wherein ordinary photographs and other pictures are made to appear with the third dimension, with or without the benefit of a specially provided illuminating means.

A further object is to provide a projection screen unit for motion pictures by which pictures projected thereon may be perceived in apparent three dimensions, employing customary films and projectors.

A further object is to provide a picture frame in which a picture placed therein shows the depth illusionally.

A still further object is to provide an internally illuminated display apparatus wherein pictures may be presented in illusory three dimensions.

A feature of the invention is the employment of a screen adapted to derive a plurality of mutually displaced images or a defined image and trail-like images of a picture when the picture is viewed through it and to render the images differently perceptive to the two eyes of a spectator positioned within a certain viewing scope.

Another feature is the employment of a screen which comprises a mutitudinously grooved surface and light admissive and interceptive striped surface superposed a distance apart to obtain suitable moire effect so as to discriminately intercept mutually displaced images derived by the grooved surface of a picture placed at the back of the screen.

Another feature is the provision of a screen as above in which the pitches of the recurring ridges and grooves and of the stripes of light admissive and interceptive strips and the distance therebetween are dimensionally related to each other so as to manifest moire patterns of such pitches to the eyes of a spectator positioned within a predetermined effective viewing scope as to discriminately intercept the mutually displaced images derived by the grooved surface by exposing differently displaced images to the eyes through dissimilar parts of the moire patterns.

A further feature of the invention is the employment of a grooved plate in which the ridges and grooves are smoothly joined by curved groove walls into a wave or near wave formation for the purpose of minimizing or virtually eliminating the distortion of images due to the moire effect that is otherwise conspicuous to viewing eyes.

A further feature is the employment of two multitudinously parallel grooved surfaces, one adapted to derive a plurality of images of a picture and the other to discriminately intercept said images, exposing differently refracted images to the eyes of a spectator positioned within an effective viewing scope through dissimilar parts of moire patterns produced by the interaction of the grooved surfaces, for the purpose of obtaining a three dimensional effect and allowing more illuminating light to be transmitted therethrough to the picture.

A still further feature of this invention is the employment of two striped surfaces, either two grooved surfaces or surfaces one grooved and one opaque-transparent striped, in which the pitches of the stripes on the two surfaces are equal or somewhat or slightly different for securing a small moire variation for desired scope of viewing distance.

A still further feature is the employment of a grid intercepter to avoid surface reflection from a refractive screen.

With the above and other objects in view, the invention comprises certain detail of construction and arrangement of parts as will be hereinafter more fully described, illustrated and claimed, the reference being had in the accompanying drawings which form a part of this specification.

In the drawings,

Fig. 1 is a front view of a picture frame, partly broken away, embodying the invention;

Fig. 2 is a horizontal section of the above, taken along line 2—2 thereof;

Fig. 3 represents an enlarged perspective view of a fragment taken from one of the corners (3—3) of the screen appearing in the preceding views;

Fig. 4 illustrates in perspective a partly open view of a projection screen unit, also an embodiment of the invention, for a motion picture or lantern slide projection;

Figs. 5 to 10 show various modifications of the refractor, a part of a refractive screen, in magnified fragmental section cut across the grooves thereon. Any one of these may be used as a component part of a refractive screen embodying my invention;

Figs. 11 to 15 illustrate enlarged fragmental views of various modifications of the intercepter, another component of the refractive screen;

Figs. 16 to 18 depict several combinations in perspective, as examples, of the parts illustrated in Figs. 5 to 15;

Fig. 19 represents a vertical sectional view of a display apparatus, an embodiment of the invention;

Fig. 20 graphically depicts the optical function of the refractor with respect to rays coming from a given point of a picture.

Fig. 21 illustrates the optical function of the refractive screen;

Fig. 22 theoretically explains the function of the refractive screen with respect to the teamed eyes of a spectator, leading to the perception of depth in a picture; and Figs. 23 and 24 are respectively a horizontal sectional view and a front view of a magnified fragment of a grid screen or plate which is a modification of the intercepter, Fig. 23 showing the relative position of this plate with respect to a refractor.

Similar numerals designate similar parts throughout several views.

Referring to Figs. 1 and 2, numeral 20 designates a frame for pictures, having a somewhat deeper recess than a conventional picture frame. Clamped at the front part of the frame between the molding 21 and a rectangular spacer 22, a refractive screen comprises a refractor 24 and an intercepter 23 in form of plates or sheets spaced a suitable distance apart by a second spacer 25 and secured together by a suitable means such as a paper hemming 26 to constitute a unit. Although it is preferable to have an air space between the refractor and intercepter, the spacer may be a transparent plate of desired thickness to make a compact unit. The thickness of the spacer is determined from the desired distance between the functioning surfaces of the two plates in accordance to the mathematical formulae which will be given in the later part of this specification.

The plates of the screen are made of transparent material, such as transparent thermoplastics, for instances, cellulose of acetate or polymerized methyl methacrylate derivative, by molding or forming or by machining the grooves, or glass or like material may be used in cases when the grooving is not required to be too fine for proper molding.

As illustrated in Fig. 3, the back plate or refractor 24 has its grooved contour in form of ridge and groove stripes which in this instance consist of parallel series of flat ridges and curved groove walls, while the front plate or intercepter 23 has one of its surfaces grooved to a parallel row of semi-cylindrical strips which are flattened at the middle parts and functionally equivalent to opaque and transparent stripes as will be later explained. The grooved surfaces of the two plates are located confronting each other with the grooves on both surfaces set vertically in parallel or approximately in parallel to each other. The pitches of the ridge-groove stripes on both surfaces are equal or slightly different.

Behind the spacer 22, a picture or picture carrier 27 is held between plates 28 and 29 which are in turn pressed against the spacer 22 by a suitable locking means 30. It goes without saying that when a stiff picture carrier is to be used, these plates become superfluous and therefore may be dispensed with.

The picture 27 may be illuminated through the screen or from the sides (see Fig. 19) via the transparent plate 28 or from the rear of the frame providing the back plate 29 in translucent construction. Needless to add, the picture is to be viewed through the screen and the same goes in all cases herein referred to.

In Fig. 4, within a frame 31 of size required for housing a projection screen for a still or motion picture a refractive screen 23'—24' is disposed. At the rear of the refractive screen and separated therefrom by a spacer 22', there is located a light pervious and dispersive screen 32 of heavily frosted glass or plastic material or the like. Together with the frame, these screens constitute a projection screen unit.

Although I have illustrated in the drawings the relative position of parts as they appear, it is to be understood that the dimensional proportion is by no means actual. For an example, the thickness of the spacer 25 or 25' is much exaggerated in comparison with that of the spacer 22 or 22' and so is the thickness of the screen plates. The dimensions of the parts should be determined in accordance with the size of pictures to be presented and the purpose for which the apparatus is intended, and it can be easily done guided by the formulae herein given.

The intercepter (front plate) 23' may be any one of the deep cut grooved plates herein shown or an opaque-transparent striped plate (see Fig. 13) or may be a grid screen as shown in Figs. 23 and 24. The grid screen may be constructed by cutting slits through any suitable sheeting or by joining strips or wire strands with narrow horizontal bars as indicated by numerals 33 and 34 in Figs. 23 and 24. The grid is painted dead black to eliminate the surface reflection of light. I may employ such a grid screen instead of an intercepter of transparent material, when the surface reflection is found to be annoying to spectators, or the provision of adequate sound channels therethrough is desired for articulate cinematograph projection.

The refractor 24' may be any one of the refractor plates herein shown and described. These plates are suitably separated by a spacer 25' as in the previous views.

The projection screen unit above described may be adapted for an articulate cinematograph projection either by providing sound channels around the circumferential edges or slits 35 which are represented by vertical lines in Fig. 4 or a multitude of perforations through the screen plates as indicated by numeral 35' in Figs. 7 and 12.

Pictures are projected in operation directly on the projection screen 32 from a position some distance back of the screen and presented through the refractive screen 23'—24' to spectators seated in front (the left side) thereof within a predetermined effective viewing scope.

In Figs. 5 to 10, a double headed arrow 36 denotes the pitch of ridge-groove stripes on each plate. The other arrowed broken lines show the paths of rays in traversing respective plates in the direction of arrows, illustrating the refraction of rays by curved surfaces of each plate in contrast to substantially undeflected rays through level or near level parts thereof.

In Fig. 5, the plate has a surface grooved in form of the stripes of flat ridges 37 and curved walls or furrows 38 like the refractor in Fig. 3.

In Fig. 6, the grooved surface has a contour of the stripes of flat groove bottoms 39 and curved walls 40.

In Fig. 7, the refractive surface takes a contour of flat ridges 37, flat bottoms 39 and curved walls 40, the latter smoothly joining the first two. The wall surfaces should be considerably narrower than the ridge or bottom surfaces for better performance. Note a perforation 35' for sound transmission.

Fig. 8 is a direct modification of Fig. 5, the flat ridges in the latter view being slightly curved to form a parallel row of elliptic convex cylindrical lenses.

Fig. 9 shows a modification of the plate of Fig. 6, the bottoms of the grooves being slightly curved to form a series of parallel concave or hollow cylindrical lenses with an elliptical curvature.

In Fig. 10, the profile of the refractive surface of the plate appears in a recurring wave formation, a modification of Fig. 7.

Any one of the above described plates may be used as the refractor of a refractive screen embodying the invention. However, discretion should be exercised in deciding the form of refractor according to the purpose and size of apparatus in which it is to be incorporated.

When a refractor such as shown in Figs. 8 and 10 is employed, it should be remembered that every strip image perceived through a curved ridge will be laterally reversed, if a picture is placed beyond the focal plane of the lenses.

In Fig. 11, one surface of the intercepter has a contour of parallel semi-cylindrical strips which may be circularly or elliptically curved. Such plate, when viewed from the flat side, shows a distinct striped appearance (see Fig. 17), the edge parts 41 of the strips functioning as opaque strips.

In Fig. 12, the top or middle part of each cylindrical strip of Fig. 11 is flattened. The perforation 35' is a sound channel.

In Fig. 13, an intercepter in form of an opaque-transparent striped plate is shown. The opaque strips 41' may be obtained by printing black on a transparent sheet or plate or by filling parallel grooves cut or molded on a transparent plate with a suitable dead black material, such as crayon or ink. The opaque strips may be substituted by translucent or transparent color strips, when desired to tint the images perceived therethrough and increase illumination. It is found that the opaque strips should be wider for better performance in comparison with the transparent strips, however the resultant loss of visual rays makes the widening of the opaque strips a matter of compromise.

In Fig. 14, an intercepter has concave cylindrical strips which also show a striped appearance, when viewed from the flat side.

In Fig. 15, another modification of the intercepter is shown. This plate functions almost similarly as an opaque-transparent striped plate, the rather steep walls 41'' being functionally equivalent to the opaque strips, within a limited angular scope.

Any one of the intercepters shown in Figs. 11 to 15 may be employed as a component of a refractive screen embodying this invention, though some may be preferable to the others depending upon what purpose the finished apparatus will be used for.

In Fig. 16, the refractive screen comprises a refractor 24'' as one in Fig. 7 and an intercepter 23'' as one in Fig. 13. The opaque or interceptive strips are represented by shaded bands 41'.

In Fig. 17, the refractor of Fig. 10 and intercepter of Fig. 11 are the components of a refractive screen, an embodiment of the invention. The interceptive strips 41''' are shown through the transparent body by shaded bands.

In Fig. 18, a plate bears on one of its surfaces a series of parallel convex cylindrical strips as of Fig. 8 for the refractor and the other surface has the stripes of opaque and transparent strips for the intercepter, constituting a refractive screen, and embodying the invention.

The refractors and intercepters and the combinations thereof herein shown are by no means exhaustive as possible modifications, but may be taken as fundamental examples.

In Fig. 19, a side illuminated display apparatus is shown. When an opaque-transparent striped intercepter is used in the refractive screen, pictures on opaque carriers can be more effectively illuminated by this means.

The housing 42 has a front window 43 which is adapted to hold a refractive screen comprising an opaque-transparent striped sheet 23'' and grooved sheet 24'' (represented by heavy lines) as those shown in Fig. 16. These sheets are held separately between transparent plates which are shown in shaded sections. A back window 44 is equipped with a picture frame 45. The screen and picture frame are suitably separated for the best performance.

A picture 46 in the frame 45 is obliquely illuminated by lamps 47, 47 in the compartments at the top and bottom parts of the housing. In this means of illumination it is required to have an adequate space between the screen and picture for effective illumination. For small pictures and close viewing a fine grooving (say with 80 grooves or stripes per inch) is desirable and hence the requirement of comparatively wide spacing between the screen and picture calls for flat ridged and/or flat bottomed refractor or a refractor having curved ridges and/or bottoms of small lens power in order to secure clear views.

In Fig. 20, the function of a refractor is illustrated. The mission of the refractor is to derive a plurality of mutually displaced images in viewing a picture therethrough, that is, to make a picture appear at a plurality of positions and is attained by plurally refracting rays from each point of the picture to horizontally different directions which vary in cycle multitudinously recurring as do the ridge-groove stripes. It is done in such manner that through the level (parallel to the plane of the plate) parts a fairly defined image of the picture is perceptible consisting of a multitude of parallel strip images and through the other parts groups of mutually displaced images or trail-like images, as of swiftly moving bodies, are perceptible on either sides of the first image. In short the images of the picture are perceptible in a number of mutually displaced positions, most prominently in one position.

Referring to Fig. 20, numerals 27' and 24'' designate horizontal sections of a picture and refractor respectively. The grooves are shown in much exaggerated form for the sake of illustration.

An eye 48 viewing a small area 49 on the picture 27' through the refractor 24'' (temporarily forgetting the presence of a dash line 50) perceives a plurality of images of said area, since a narrow beam represented by a ray 51 passing through a level surface of the refractor impresses the eye with a little or no appreciable change of direction, while beams presented by rays 52, 53 etc. being refracted at respective groove walls 54, 55 etc. reach the eye from different directions, resulting to the perception of the area 49 at several mutually displaced positions 49, 56, 57 etc. The dot-dash lines indicate the visual lines to these positions.

As every small area of the picture would similarly impress the eye, the picture as a whole will be perceived by the eye in a composite form of a fairly defined image overlappingly accompanied by trail-like images on both sides thereof. As the number of beams contributing to the perception of the trial-like images increases with the increase of the remoteness of the picture from the screen, the depth expression of the picture would be augmented by the increase of the spacing between the screen and picture.

Let the dash line 50 represent an opaque-transparent striped intercepter as in Fig. 13, the horizontal section of each opaque strip being represented by a dash. Then it will be seen that some of the visual lines to the eye 48 are intercepted by opaque strips, resulting to discriminate obstruction of differently refracted rays and hence of differently displaced images of the area. As will be readily understood, the discriminatory interception of the differently displaced images varies with the horizontal position of the eye. The dotted lines indicate the obstructed visual lines. In this instance, the eye preceives only one of the trail-like images consisting of a plurality of side images perceived by the ways of visual lines 48—52, 48—52' etc. Assuming the eye remains stationary, the above aspect continues for an area around the area 49. In another instance, the eye may perceive an area of the picture through level parts alone, receiving an impression of a defined image. In still other instances, the eye may perceive other areas of the picture in the other trail-like image or in the combination of a defined image and a trail-like image. When the eye is shifted horizontally with respect to the screen and picture, the aspect gradually varies with the movement of the eye. The above will be explained as a sequel of a moire effect.

Referring to Fig. 21, the magnified horizontal sections of a picture 27, refractor 24 and an intercepter 23 are designated by respective numerals in accordance with Figs. 2 and 3, representing a small fragmental part of the screen.

Since a parallel row of convex cylindrical strips function as opaque-transparent stripes, as described in reference to Fig. 17, the discriminate interception of the rays carrying images of each area of a picture as explained in reference to Fig. 20 would similarly take place in this case.

Rays 59, 59 representing narrow beams traverse through level (and near level) parts of the ridge-groove stripes of both plates, impressing an eye 40' with a little or no appreciable change of direction and together with other beams refracted likewise contribute to the perception of an image of the picture in aggregated vertical strips which may appear as continuous.

Rays 59, 60 representing other narrow beams of light proceeding from the picture in direction toward the eye are admitted to pass through the flat ridges (or flat bottoms) of the refractor 24, but are intercepted by the edge parts of cylindrical strips on the intercepter 23 and thereby deflected away from the courses initially taken, thus explaining the function of the edge parts of the cylindrical strips as intercepting strips.

Rays 61, 61 representing still other beams of light proceeding from the picture toward the eye are refracted at groove walls of the refractor 24 and pass through level parts of the intercepter 23. Having been thus deflected away from the initial courses, these beams together with others refracted likewise contribute to the perception of side images by an eye in their paths. Because of the curved refractive surfaces at which the rays are refracted, said side images would be in form of a trail-like image consisting of a number of mutually displaced images, as explained in reference to Fig. 20.

As explained in reference to Fig. 20, beams refracted at other parts of the groove walls in similar manner as the rays 61, 61 contribute or tend to contribute in impressing the eye 40' with trail-like images on either sides of the defined image which is due to the beams 58, 58 and rays refracted likewise. Rays refracted like the rays 59, 60 may or may not contribute to the perception of the trail-like images, depending upon the direction of refraction with respect to the position of the eye. Rays 62 which happen to be refracted at both groove walls of the refractor and edge parts of cylindrical strips on the intercepter may be deflected away out of the visual scope of the eye with little probability of contributing to the formation of the trail-like images.

As previously mentioned, when the refractor (or the intercepter in some instances) has a surface of parallel cylindrical lenses as in Figs. 9 and 10, every image strip perceived through a convex cylindrical lens may be laterally reversed, but the reversal is not conspicuous, when the number of the strips per unit length is sufficiently large for the eyes at the intended viewing distance to make the image appear virtually continuous, and therefore such lens strips are not detrimental for the performance of the invention.

It is known that when two striped surfaces placed in superposing position and in close proximity with the strips in parallel or at a small angle, there will be the manifestation of a phenomenon called a moire effect. Similar effect is manifested between two grooved surfaces and between a grooved surface and an opaque-transparent striped surface, such as shown and described herein, in similar position as above. When the recurring pitches of the grooves and stripes are uniform and equal or nearly equal, a sort of moire effect inevitably reveals itself in moire patterns to a viewing eye, more or less prominently depending upon a number of factors, including the relative pitches of the grooves and stripes, the distance between the surfaces and the surface contour of the back surface. The moire pattern resembles the back surface though in much magnified scale. This phenomenon owes its manifestation to the conjunction of varied combinations of the strips on the two surfaces with the viewing eye in cyclically recurring order. Hence, moire patterns appearing on the superposed surfaces vary their lateral dimensions with the viewing distance and shift with the viewing eye in the same or opposite direction, as will be later referred to.

A moire pattern is an enlarged pseudo image of grooves and ridges on the back surface or a composite image consisting of a number of mutually displaced images thereof in magnified scale, incidentally retaining differently refractive property of different parts of the groove-ridge stripes, roughly at corresponding parts of the moire pattern. However, as the moire pattern is a composite image of mutually displaced images of the groove-ridge stripes, the refractive characteristics at various parts of the moire pattern is likewise the composition of different refractive characteristics of adjacent parts of the groove-ridge stripes.

A rough imitation of a moire pattern which may be perceptible on a refractive screen is represented by parallel broken lines in Fig. 4, showing that when the stripes on both surfaces are parallel the resultant moire patterns run in the same direction, vertical direction as the stripes.

Although this invention relies on the moire effect to obtain required dimensional relationship between the interpupillary distance and the pitch of recurring differently refractive parts of the screen, so that teamed eyes would perceive images of a picture by dissimilarly refracted rays, the least conspicuousness of moire patterns is desirable in order to present clear least distorted views of pictures. For this reason sudden change of the surface contour of the refractive surface should be avoided.

Having rounded all angular corners in and around the grooves of the refractor, it will be found that when a picture is placed behind the refractive screen sufficiently near thereto, moire patterns on the screen become virtually, if not totally, imperceptible, unless the viewing eyes are shifted horizontally from one position to another. With increased distance between the picture and screen, the moire patterns increase their prominence which may result in certain distortion or blurring of the view of picture. On the other hand, the depth expression of the view becomes more prominent with the increased distance between the picture and screen. Therefore, the determination of desirable distance between the picture and screen is a matter of compromise and can be reached by trial and adjustment. However, the spacing between these parts is partly dependent upon the scope of differently refractive power of the refractive surface and hence upon the steepness of the groove walls or the depth of the grooves. Smaller scope of refraction permits greater spacing without bringing out the undersirable effects.

When the present screen is used for motion picture projections or for large picture displays, the distance between the screen and picture screen or pictures may be large, providing shallow grooves well rounded at the edges. By this means the moire patterns can be made practically, if not entirely, imperceptible to viewing eyes.

The purpose of the superposition of a refractor and an intercepter is thus for creating the condition by virtue of a moire effect that the two eyes of a spectator would perceive images by rays coming from each small area of a picture through dissimilar parts of moire patterns or for functionally enlarging the pitch of differently refractive cycles to the tune of the interpupillary distance, in order to have the intersections of visual lines from the eyes on various planes; on the plane of the picture and on planes in front and at the back thereof in certain combination, as will be subsequently described.

In Fig. 22, numerals 27″, 25″ and 23″ designate horizontal sections of a picture, refractor and an intercepter, cut along a plane right angle to the grooves on the refractor.

An interpupillary line, a straight line connecting the eye pupils of a spectator, is herein assumed to be in the horizontal direction in accordance with normal viewing position. Hence, any references herein made to the horizontal direction should be understood to mean the direction of interpupillary line.

Each of eyes 63 and 64 viewing a small area 65 of the picture 27″ would perceive, in the absence of the intercepter 23″, one fairly defined image and trail-like images of the area as explained in reference to Fig. 20. The heavy broken line and heavy dotted line denote the visual lines for the defined image and lighter broken and dotted lines those for the trail-like images. Three broken or dotted lines on each side of the visual lines for the defined image represent a number of similar visual lines in respective neighborhoods for side images which contribute to the formation of the trail-like images.

These visual lines intersect at numerous positions: The visual lines for the defined image perceptible to the eyes meet substantially at 65, the true position of the area. Each visual line for the defined image intersects with a number of visual lines for the trail-like images, as at 66, 67, 68 and 69 in front and at the back of the picture plane. Beside these intersections, there are intersections between the visual lines for the trail-like images at other numerous positions, as at 70, 71, 72 and 73.

The function of the intercepter 23″ is to intercept or obstruct some of the visual lines in order to reduce the number to a single group of similar visual lines, as illustrated in reference to the heavy dash line 59 in Fig. 20.

In Fig. 22, the heavy bent lines above and below the intercepter 23″ represent parts of two moire patterns in corresponding ridge-groove contour of the refractor, perceptible to the left eye 63 represented by line 63′ under the intercepter and perceptible to the right eye 64 by line 64′ above the intercepter, remembering that moire patterns perceptible to the eyes do not appear at the same position but are displaced from each other. The level and inclined parts of each bent line respectively represent such parts of the moire pattern, which are pseudo images of the level and wall parts of a ridge-groove stripe.

When the moire patterns appear to the eyes with suitable horizontal pitches, all of the visual lines for the trail-like image converging to one of the eyes may be intercepted, leaving the visual line for the defined image alone, while the visual lines converging to the other eye are partly intercepted. In such case, all the intersections of visual lines perceptible to the eyes will be on the uninterrupted visual line to the first eye.

In the case of Fig. 22, all the visual lines for the trail-like images to the eye 64 are interrupted as indicated by dotted lines, 64—68 being only unintercepted visual line to the eye 64, and hence all perceptible intersections including 68, 65 and 67 are on the same visual line 64—65—68. Some of the visual lines to the other eye 63 may also be intercepted, for an instance, those indicated by dotted lines including the visual line 63—69 for the defined image, or without including the latter.

Experiments with two differently colored eye pieces unmistakably prove that when the eyes of a spectator are stereoscopically focused on an object, the image impressing his ocular sensory organs is the image dominant over or more prominent than the other, whichever eye perceives the dominant image. It is the image which is perceived by one of the eyes more sensitive than the other and/or with more visibility on the object. If the images perceived by the two eyes are equally prominent or nearly so, the image impressing his sensory organs will be alternately one image now and the other image then. Though paradoxical it may seem, it will not be a composite or an overlapping image which would be a blurred image. When parts of an object are more prominently perceived by one eye while the other parts by the other eye, the image that impresses the sensory organs will be a harmoniously joined but unblended combination of the images of the parts dominantly perceived by either eyes, but not a superimposed composite image of two perceived by the eyes. The dominated images manifest their presence by functioning as coordinators with the dominant images in the perception of depth. The image perceived along the visual line 64—68 being more prominent than the others perceived along the other uninterrupted visual lines, it is the image which impresses the sensory organs, the images perceived by the eye 63 functioning as the coordinators in the perception of the third dimension.

Thus each area of the picture is perceived by the eyes to be on various intersections of visual lines on either one of the visual lines for the defined image, depending upon the position of the area with respect to the moire patterns perceptible to the eyes. When the screen is sufficiently large to cover a number of the moire cycles perceptible to the eyes at a given position, the image impressing the sensory organs as an image of the picture would be the combination of vertical band images, every other band owing to the perception of each eye.

Under such circumstance, the faculty of the ocular sensory organs, it seems, is capable to rationalize the varied perception of apparent location of each and every area of the picture and to place the area in appropriate order, giving rise to the perception of depth, as can be reasonably deduced from the faculty shown by the organs in the pseudo stereoscopic perception in a photograph when viewed by one eye alone and in the perfectly matching connection of two different images of an object perceived by two eyes, to say nothing of the faculty of eyes in a stereoscopic perception.

For determining appropriate relative dimensions of the pitches of the groove-ridge stripes and light admissive-interceptive stripes and the spacing therebetween to obtain desired moire effect, the subsequent description is appended as a reference.

Assuming for the fundamental example that the striped surfaces are perfectly flat and in parallel to each other, the stripes on both surfaces are uniform throughout the width and all stripes on both surfaces are parallel to one another, the dimensional relation between the pitches of a moire pattern P and the stripes on the intercepter and refractor, respectively denoted by P' and P'' with respect to the spacing S between the two surfaces and the viewing distance D (measured from the intercepter surface) may be expressed by the formula $$P = \frac{1}{\frac{1}{P''} - \frac{1}{P'} + \frac{S}{DP''}}$$

Since the moire effect is a result of a cyclic variation in the relative position of stripes on two surfaces with respect to a viewing eye, the number of moire occurrences must be equal to the difference between the numbers of stripes on the two surfaces within the angle formed by two given visual lines from the eye. The widths of the two striped surfaces within said angle will have ratio $1:1+S/D$. $1/P'$ and $1/P''$ respectively express the exact numbers, meaning to include fractions if any, of stripes per unit length on the intercepter and refractor. Hence, taking the width of the intercepter part within the angle as unit length, the difference of the numbers of stripes within the angle is $$\frac{D+S}{DP''} - \frac{1}{P'} = \frac{1}{P''} - \frac{1}{P'} + \frac{S}{DP''}$$

The above is equal to the number of moire cycles per unit length, which may be a fraction. The reciprocal of the above value is therefore equal to the moire pitch.

When the pitches of stripes on the two surfaces are equal the formula is simplified to $$P = \frac{DP''}{S}$$

which shows that the moire pitch appears larger proportionally with increasing viewing distance.

When the pitches of stripes on the two surfaces are not equal, there will be a viewing distance at which the moire pitch is theoretically infinitely great. This distance may be expressed by the formula $$\frac{SP'}{P'' - P'}$$

Draw two lines embracing therebetween exactly equal numbers of stripes on the two surfaces. When the pitches of the stripes are not equal on the two surfaces, these lines will meet at a point on the side of the surface having smaller pitch. Let D' be the perpendicular distance from the striped surface of the intercepter to the point. Then we have by a simple geometrical process $$\frac{P'}{P''} = \frac{D'}{D'+S}$$

The value of D' expresses the nodal distance and can be easily derived from the above equation. The viewing plane at the distance may be called the nodal plane of the screen.

In practice, if the spacing S between the striped surfaces is small, an eye at the nodal plane may perceive two sets of moire bands moving in opposite directions when the eye is horizontally shifted, unless both striped surfaces are perfectly flat and in parallel.

When the pitch of the stripes on the intercepter P' is greater than on the refractor, the nodal plane will be an imaginary plane located behind the screen. When P'' is greater than P', the nodal plane appears in front of the screen at distance $SP'/(P''-P')$ at which the lateral movement of the moire pattern with the viewing eye reverses its direction. When the viewing distance is greater than $SP'/(P''-P')$, the pattern shifts with the eye in the opposite direction.

In order to have one's eyes perceive images of the same part of a picture through dissimilar parts of moire patterns, the pitch of the moire patterns perceived by each eye should have a value within a certain limit.

From the formulae herein given, suitable pitches of the ridge-groove stripes on a refractor and light admissive-interceptive stripes on an intercepter and appropriate spacing therebetween can be determined to secure the maximum effective scope of viewing distance for any given size and fineness of pictures and intended viewing scope.

When the pitches of stripes on the two surfaces are equal, the moire pitch increases proportionally with the viewing distance, while the displacement of moire patterns perceptible to teamed eyes remains constant.

On the other hand, with the pitch of the stripes on the intercepter slightly smaller or greater than on the refractor, the moire pitch can be kept nearly constant beyond a certain viewing distance. By retaining the moire pitch within a suitable dimensional limit, the phase difference of moire patterns perceptible to teamed eyes can be kept sufficiently large with the aid of the refractive deviation for long distance viewing.

From the foregoing description taken in connection with the accompanying drawings, the construction and arrangement of parts and the method of operation will be readily understood by those skilled in the art to which this invention appertains, and while I have shown and described apparatus as I now thought to be the best embodiments of the invention, I wish to have it understood that the apparatus herein shown and described are merely illustrative and therefore that such changes or modifications may be made, when desired, as to fall within the scope of the invention as claimed.

Having thus described my invention, what I claim as new is:

1. A screen for presenting pictures in apparent three dimensions, having a refractive surface and an interceptive surface superposed in close proximity to each other, said refractive surface provided with grooves having curved walls interposed by plane strip parts and said interceptive surface provided with the stripes of light transparent and interceptive parts substantially in parallel to said grooves; the numbers of said grooves and interceptive parts laterally per unit length being at least approximately equal, and the structural and positional relation of the parts being such that bundles of radial lines drawn through said transparent parts from a point directly in the front of and at a distance from said interceptive surface embrace more plane parts than curved parts at some portions and vice versa at the other portions of said refractive surface.

2. A screen for presenting pictures in apparent three dimensions, having a refractive surface and an interceptive surface in close proximity to each other, said refractive surface provided with plane and curved parts in a stripe pattern and said interceptive surface provided with light interceptive and transparent parts also in a stripe pattern, running substantially in the same direction with the plane and curved parts; the numbers of said curved parts and interceptive parts per unit length being at least approximately equal, and the structural and positional relation between the parts being such that bundles of radial lines drawn through the transparent parts from a point directly in the front of and at a distance from said interceptive surface embrace more plane parts than curved parts at some portions and vice versa at the other portions of said refractive surface.

3. A screen for presenting pictures in apparent three dimensions, provided with a refractive element and an interceptive element of transparent material contiguously superposed, said refractive element having grooves with curved walls interposed by plane strip parts and said interceptive element having light interceptive strips interposed by transparent strips substantially in parallel to said grooves; the numbers of said plane strip parts and transparent strips per unit length being approximately equal, and the structural and positional relation between the parts being such that bundles of radial lines drawn through said transparent strips from a point directly in the front of and at a distance from said interceptive element embrace more curved walls and less plane strip parts at some portions and vice versa at the other portions on said refractive element.

4. A screen for presenting pictures in apparent three dimensions, having a refractive surface and an interceptive surface superposed in close proximity to each other, said refractive surface provided with plane and curved strip parts smoothly continuing without angular kinks and said interceptive surface provided with the stripes of light transparent and interceptive parts, running substantially in the same direction with said plane and curved strip parts; the numbers of said plane strip parts and transparent parts per unit length being at least approximately equal, and the structural and positional relation between the parts being such that bundles of radial lines drawn through the transparent parts from a point directly in the front of and at a distance from said interceptive surface embrace more plane and less curved parts at some portions and vice versa at the other portions of said refractive surface.

5. A screen for presenting pictures in apparent three dimensions, comprising a transparent plate of small thickness, provided with a refractive surface which consists of a multitude of groove surfaces with curved walls and plane strip parts in a stripe pattern and an interceptive surface which carries interceptive strip parts interposed by transparent strip parts running substantially in the same direction with said groove surfaces; the numbers of the groove surfaces and interceptive strip parts per unit length being at least approximately equal, and the structural and positional relation between the parts being such that bundles of radial lines drawn through said transparent strip parts from a point directly in the front of and at a distance from said interceptive surface embrace more plane strip parts than curved groove walls at some portions and vice versa at the other portions of said refractive surface.

6. The combination with a picture receiving element; of a screen described in claim 1 for presenting pictures in apparent three dimensions disposed in the front of said picture receiving element a distance away.

NAWOKICH TANAKA.